United States Patent [19]

Wainscott et al.

[11] Patent Number: 4,692,004
[45] Date of Patent: Sep. 8, 1987

[54] PROJECT-O-CYCLE

[76] Inventors: Delores A. Wainscott, 6446 Bamboo Ave., Cocoa, Fla. 32927; George Spector, 233 Broadway, Rm 3815, New York, N.Y. 10007

[21] Appl. No.: 918,706

[22] Filed: Oct. 14, 1986

[51] Int. Cl.⁴ ............................................. G03B 29/00
[52] U.S. Cl. ..................................... 352/132; 272/18
[58] Field of Search ................... 352/131, 132; 272/16, 272/18, 73

[56] References Cited

U.S. PATENT DOCUMENTS 4,141,630  2/1979  Emmons ............................. 352/132

FOREIGN PATENT DOCUMENTS 2949630  7/1980  Fed. Rep. of Germany ........ 272/73
3210899  10/1983  Fed. Rep. of Germany ........ 272/73
3218086  12/1983  Fed. Rep. of Germany ........ 272/73
3404539  8/1985  Fed. Rep. of Germany ........ 272/73

OTHER PUBLICATIONS

*Popular Science*, Nov. 1983, p. 116.

*Primary Examiner*—Monroe H. Hayes

[57] ABSTRACT

A projector cycle is provided and consists of four movie projectors mounted adjacent to and extending above a seat tube of an exercise bicycle that are mechanically connected to a crankset of the exercise bicycle whereby the turning of the crankset will operate the projectors to project motion pictures in different directions from the exercise bicycle onto a screen. An optical mechanism can be used for extending the motion pictures further above the seat tube onto the screen.

4 Claims, 5 Drawing Figures

PROJECT-O-CYCLE

BACKGROUND OF THE INVENTION

The instant invention relates generally to optical outdoor scene simulators and more specifically it relates to a projector cycle.

Numerous optical outdoor scene simulators have been provided in prior art that are adapted to utilize movie projectors to project action pictures onto viewing screens. For example, U.S. Pat. Nos. 3,408,067; 4,074,903 and 4,141,630 all are illustrative of such prior art. While these units may be suitable for the particular purpose to which they address, they would not be as suitable for the purposes of the present invention as heretofore described.

SUMMARY OF THE INVENTION

A primary object of the present invention is to provide a projector cycle, that will overcome the shortcomings of the prior art devices.

Another object is to provide a projector cycle that synchronizes a plurality of movie projector mechanisms with the pedal crank system of an exercise bicycle.

An additional object is to provide a projector cycle that utilizes an optical method for viewing the film from the movie projector.

A further object is to provide a projector cycle that is simple and easy to use.

A still further object is to provide a projector cycle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
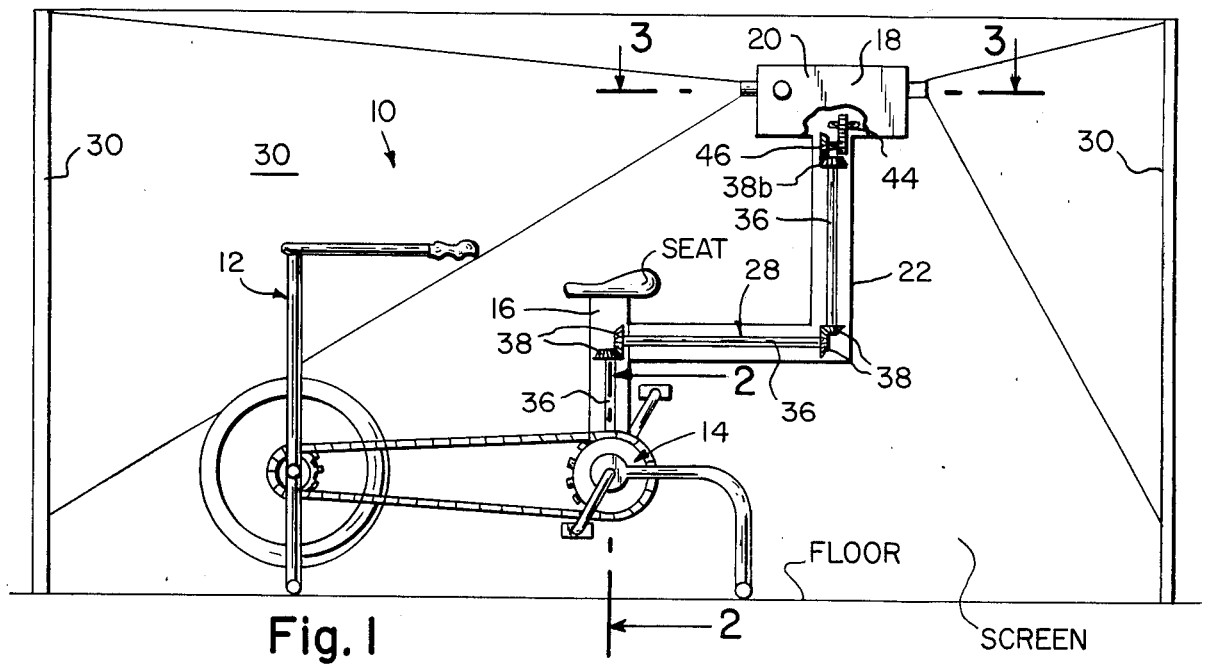
FIG. 1 is a side view of the invention.
Figures 2, 3:
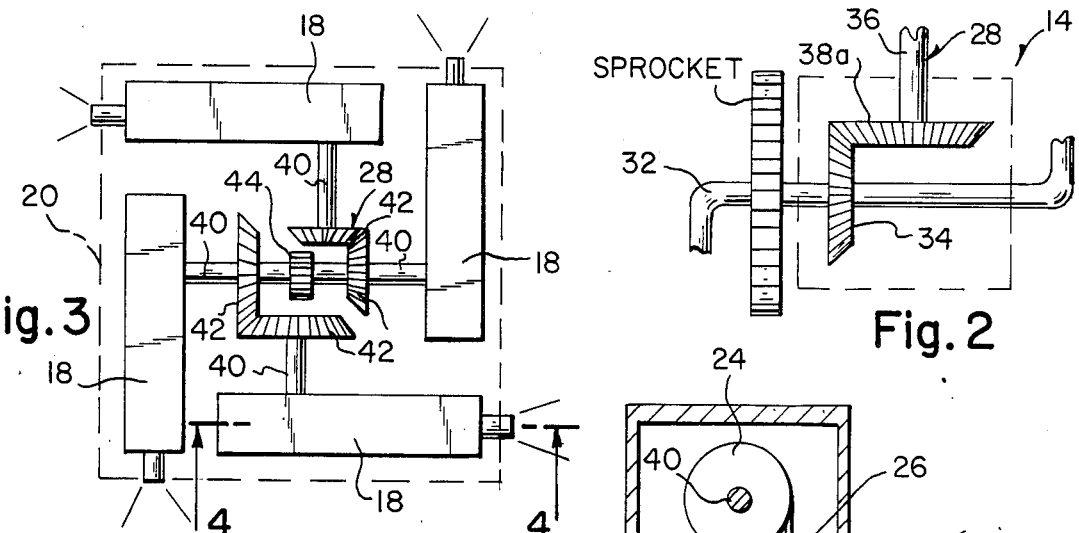
FIG. 2 is a diagrammatic cross sectional view taken along line 2—2 in FIG. 1 showing the crank axle with corresponding bevel gears.
FIG. 3 is a diagrammatic cross sectional view taken along line 3—3 in FIG. 1 showing the four projectors within the main housing.

Turning now descriptively to the drawings, in which similar reference characters denote similar elements throughout the several views, Figures through 4 illustrate a projector cycle 10 that consists of an exercise bicycle 12 that has a crankset 14 and a seat tube 16. Four projectors 18 within a main housing 20 are mounted adjacent to and extending above the seat tube 16 by a C-shaped arm 22. Each of the projectors 18 have a film transport 24 for moving a single frame of film 26 in the projector.

A mechanical mechanism 28 connects the crankset 14 to each of the film transports 24 and capable of moving the film 26 a frame at a time in coordination with rotation of the crankset 14. Each of the projectors 18 will project motion pictures in a different direction from the exercise bicycle 12 onto a screen 30.

The mechanical mechanism 28 includes the crankset 14 having a crank axle 32 with a drive bevel gear 34 thereon. A series of elongated interconnecting rods 36 are provided. Each of the rods 36 has a driven bevel gear 38 at each end so that the drive bevel gear 34 will rotate the lowest driven bevel gear 38a to turn all of the rods 36.

Each of the projectors 18 has a shaft 40 with a bevel gear 42 extending from the film transport 24. Two opposite shafts 40 are interconnected and have a master gear 44 thereon in which the highest driven bevel gear 38b will turn the master gear 44 and all of the projector bevel gears 42 through a gear train 46.

Figures 4, 5:
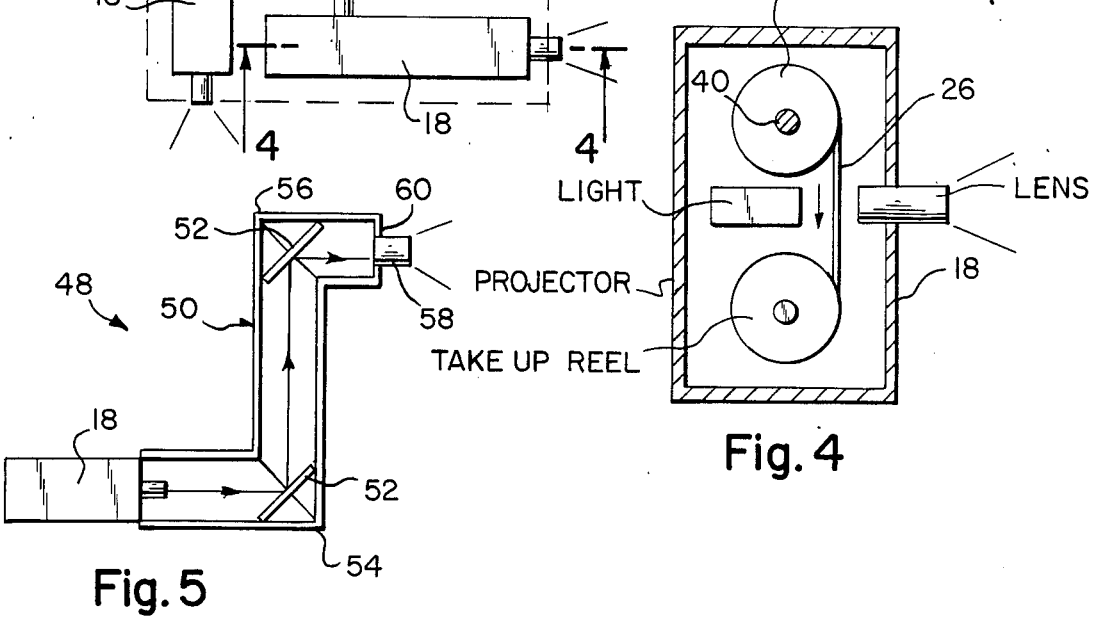
FIG. 4 is a cross sectional view taken along line 4—4 in FIG. 3 showing diagrammatically the internal mechanism of one of the projectors.
FIG. 5 is a side view of one of the projectors using an optical method for viewing the film.

As shown in FIG. 5 each of the projectors 18 further contains an optical mechanism 48 for extending the motion picutres further above the seat tube 16 onto the screen 30. Each of the optical mechanisms 48 includes a transparent Z-shaped casing 50 affixed to the projector 18. A pair of mirrors 52 are mounted within the casing 50. One of the mirrors 52, is angularly mounted at bottom corner 54 of the casing while other mirror 52 is angularly mounted at top corner 56 of the casing to reflect image of the motion picture upwardly. A lens 58 is mounted at top end 60 of the casing 50 to project the motion picture image onto the screen 30.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A projector cycle which comprises:
    (a) an exercise bicycle having a crankset and a seat tube;
    (b) four projectors being mounted adjacent to and extending above said seat tube, each of said projectors having a film transport for moving a single frame of film in said projector; and
    (c) a mechanical mechanism connecting said crankset to each of said film transports and capable of moving said film a frame at a time in coordination with rotation of said crankset so that each of said projectors will project motion pictures in a different direction from said exercise bicycle onto a screen.

2. A projector cycle as recited in claim 1, wherein said mechanical mechanism includes:
    (a) said crankset having a crank axle with a drive bevel gear thereon; and
    (b) a series of elongated interconnecting rods, each of said rods having a driven bevel gear at each end so that said drive bevel gear will rotate said lowest driven bevel gear to turn all of said rods; and
    (c) each of said projectors having a shaft with a bevel gear extending from said film transport whereby two opposite said shafts are interconnected having a master gear thereon in which said highest drive bevel gear will turn said master gear and all of said projectors bevel gear.

3. A projector cycle as recited in claim 2, wherein each of said projectors further comprising an optical mechanism for extending said motion pictures further above said seat tube onto said screen.

4. A projector cycle as recited in claim 3, wherein each of said optical mechanisms includes:

(a) a transparent Z-shaped casing affixed to said projector;

(b) a pair of mirrors mounted within said casing, one of said mirrors being angularly mounted at the bottom corner of said casing while the other said mirror is angularly mounted at the top corner of said casing to reflect images of said motion picture upwardly; and (c) a lens mounted at the top end of said casing to project said motion picture images onto said screen.

* * * * *